United States Patent [19]

Mitsuno et al.

[11] Patent Number: 4,604,421

[45] Date of Patent: Aug. 5, 1986

[54] POLYPROPYLENE RESIN COMPOSITION COMPRISING TALC HAVING SPECIFIED AVERAGE DIAMETER AND PARTICLE SIZE

[75] Inventors: Tatsuyuki Mitsuno; Teruhisa Koyama; Yuji Ikezawa, all of Chiba, Japan

[73] Assignee: Sumitomo Chemical Company, Limited, Osaka, Japan

[21] Appl. No.: 716,300

[22] Filed: Mar. 26, 1985

[30] Foreign Application Priority Data

Mar. 27, 1984 [JP] Japan .................... 59-60263

[51] Int. Cl.[4] .................... C08K 3/34; C08L 23/00; C08L 53/00

[52] U.S. Cl. .................... 524/449; 524/505; 524/525; 524/528; 524/570; 524/574; 524/575

[58] Field of Search ............... 524/449, 505, 525, 528, 524/570, 574, 575

[56] References Cited

U.S. PATENT DOCUMENTS

| | | | |
|---|---|---|---|
| 4,212,914 | 7/1980 | Ponomarev et al. | 524/449 |
| 4,229,504 | 10/1980 | Brachman | 524/449 |
| 4,340,516 | 7/1982 | Keeney | 524/449 |
| 4,429,064 | 1/1984 | Marzola et al. | 524/449 |
| 4,442,243 | 4/1984 | Woodhams | 524/487 |
| 4,467,077 | 8/1984 | Meyer et al. | 524/449 |
| 4,483,958 | 11/1984 | Kosaka et al. | 524/426 |
| 4,504,617 | 3/1985 | Yui et al. | 524/449 |

FOREIGN PATENT DOCUMENTS

| | | | |
|---|---|---|---|
| 084044 | 7/1978 | Japan | 524/449 |
| 162743 | 12/1979 | Japan . | |
| 084837 | 5/1983 | Japan . | |
| 017545 | 5/1983 | Japan . | |
| 108241 | 6/1983 | Japan . | |
| 185781 | 6/1984 | Japan | 524/449 |

*Primary Examiner*—Herbert J. Lilling
*Attorney, Agent, or Firm*—Sughrue, Mion, Zinn, Macpeak, and Seas

[57] ABSTRACT

A resin composition is provided which comprises a crystalline propylene-ethylene copolymer resin mixed with mica having a specified average particle diameter and particle size distribution or a rubber-like material so that it shows an excellent balance between rigidity and impact strength and an excellent thermal resistance and provides an excellent appearance when formed in products. In a preferred embodiment, the polypropylene resin composition comprises 50 to 97% by weight of a crystalline propylene-ethylene copolymer resin, 0 to 20% by weight of a rubber-like material, and 3 to 50% by weight of mica having an average particle diameter determined by photo extinction sedimentation method of 0.5 to 4.5μ and a particle size distribution of 95% or more by weight for 10μ or less, 60% or more by weight for 5μ or less, and 10 to 80% by weight for 1μ or less.

4 Claims, No Drawings

POLYPROPYLENE RESIN COMPOSITION COMPRISING TALC HAVING SPECIFIED AVERAGE DIAMETER AND PARTICLE SIZE

FIELD OF THE INVENTION

This invention relates to a resin composition which comprises a crystalline propylene-ethylene copolymer resin mixed with mica having a specified average particle diameter and particle size distribution or a rubber-like material so that it shows an excellent balance between rigidity and impact strength and an excellent thermal resistance and provides an excellent appearance when molded in products.

BACKGROUND OF THE INVENTION

It is known in the art to mix mica into a polypropylene resin. For example, Japanese Patent Publication No. 18615/74 discloses a method of using mica having an aspect ratio (diameter/thickness) of 30 or more. Furthermore, Japanese Patent Publication Nos. 17544/83, 17545/83 and 18946/83, and Japanese Patent Application (OPI) No. 149452/81 disclose methods of using a modified polyolefin and/or amino silane compound, isocyanate compound, epoxy compound or the like together with mica (the term "OPI" as used herein refers to a "published unexamined Japanese patent application"). These methods impart an improved rigidity and tensile strength but an extremely insufficient impact strength to resin compositions.

A number of methods have been proposed to improve impact strength. For example, Japanese Patent Application (OPI) No. 162743/79 discloses a method of restricting the aspect ratio and amount of mica to be added within a specified range. Japanese Patent Application (OPI) No. 84837/83 discloses a method of restricting the amount, aspect ratio and average flake diameter of mica to be added within a specified range. Furthermore, Japanese Patent Application (OPI) No. 108241/83 discloses a method of using a polypropylene having a specified composition. However, none of these methods provide sufficient improvements in the balance between rigidity and impact strength, especially in falling weight impact strength. Therefore, these methods find difficulties in improving thermal resistance and scratch resistance of formed products while maintaining high impact strength.

The inventors have made various studies to overcome the above problems in the prior art. As a result, the inventors studied to the particle diameter and particle size distribution of mica to be added. Particularly, the inventors found that a resin composition excellent in balance between rigidity and thermal resistance, especially in falling weight impact strength, and thermal resistance which provides an excellent appearance (less scratched and warped) when formed in products can be obtained by mixing mica having an average particle diameter and particle size distribution specified within a finely divided particle size range or rubber-like material into a crystalline propylene-ethylene copolymer resin. Thus, this invention has been achieved.

SUMMARY OF THE INVENTION

Therefore, an object of this invention is to provide a polypropylene resin composition comprising 50 to 97% by weight of a crystalline propylene-ethylene copolymer resin, 0 to 20% by weight of a rubber-like material, and 3 to 50% by weight of mica having an average particle diameter determined by photo extinction and sedimentation method of 0.5 to 4.5$\mu$ and a particle size distribution of 95% or more by weight for 10$\mu$ or less, 60% or more by weight for 5$\mu$ or less, and 10 to 80% by weight for 1$\mu$ or less.

The composition of the invention is excellent in the above properties and thus provides improvements in resins for use in parts which have recently required highly well-balanced properties more and more, such as domestic electrical appliance parts, office machine parts or industrial parts represented by automobile parts or enables wider applications in new fields.

DETAILED DESCRIPTION OF THE INVENTION

As the crystalline propylene-ethylene copolymer resin for use in the invention there may be employed a copolymer resin which is obtained by polymerization of propylene and ethylene in the presence of a Ziegler-Natta catalyst, such as propylene-ethylene block copolymer resin and propylene-ethylene random copolymer resin. The melt index of these resins is within the range of 0.1 to 100, preferably 0.5 to 50. Resins having a melt index of less than 0.1 show poor molding characteristics and appearance whereas those having a melt index of 100 or more show poor impact strength. Thus resins having a melt index out of the above range are unsuitable for the present invention. Preferable among these copolymer resins is a crystalline propylene-ethylene block copolymer resin having an ethylene content of 20% or less by weight.

As the rubber-like material for use in the present invention there may be employed a hydrocarbon rubber-like material such as ethylene-propylene rubber, ethylene-propylene-nonconjugated diene rubber, ethylene-1-butene rubber, ethylene-isobutylene rubber, polyisobutylene, polyisoprene, polybutadiene, styrene-butadiene random copolymer, styrene-butadiene block copolymer (including hydrogenated copolymer), natural rubber, atactic polypropylene and mixtures thereof. Preferable among these rubbers are ethylene-propylene rubber, ethylene-butene rubber and styrene-butadiene block copolymer (including hydrogenated copolymer).

The ethylene content and Mooney viscosity $ML_{1+4}$ at 100° C. of ethylene-propylene rubber, ethylene-1-butene rubber and ethylene-propylene-nonconjugated diene rubber are within the range of 40 to 90% by weight, preferably 50 to 85% by weight, and 10 to 100, preferably 20 to 80, respectively.

The styrene content of styrene-butadiene block copolymer (including hydrogenated copolymer) is within the range of 1 to 50% by weight. The appropriate average molecular weight of styrene-butadiene block copolymer is within the range of 10,000 to 500,000. In particular, a composition comprising a crystalline propylene-ethylene block copolymer resin and an ethylene-propylene rubber is preferable.

As the mica for use in the present invention there may be employed muscovite, phlogopite, biotite or the like. Specific examples of micas which may be employed are muscovite, lepidolite, paragonite, sericite, roscoelite, phlogopite, lepidomelane, zinnwaldite and biotite. Preferable among these micas are muscovite and phlogopite. These micas must have an average particle diameter (determined in terms of the particle diameter at 50% point of a particle size distribution integration curve obtained from measurements by photo extinction and sedimentation method) of 0.5 to 4.5μ, preferably 0.8 to 4.5μ, and a particle size distribution of 95% or more by weight for 10 or less, 60% or more by weight for 5μ or less and 10 to 80% by weight for 1μ or less.

If micas having an average particle diameter of more than 4.5μ and/or those having a particle size distribution of less than 95% by weight for 10μ or less, less than 60% by weight for 5μ or less, and less than 10% by weight for 1μ or less are used in this invention, the resulting resin composition shows poor impact strength and scratch resistance.

Micas having an average particle diameter of less than 0.5μ and/or those having a particle size distribution of more than 80% by weight for 1μ or less are unsuitable for this invention because they cannot provide a sufficient improvement in rigidity of resin composition of the invention and make silver streak more likely to occur upon molding.

The measurement of the particle size distribution of the invention was effected by photo extinction and sedimentation method using an SKC type measuring instrument manufactured by Seishin Kigyo Co., Ltd.

The aspect ratio (horizontal or vertical length/thickness) of the mica for use in the invention is not specifically limited but is normally within the range of 5 to 30.

The mica for use in the invention is one obtained by precise classification of natural mica left uncrushed or after being mechanically pulverized. The precise classification is effected so as to provide a particle size distribution disclosed in the invention.

As the mechanical pulverizing means there may be employed granulators such as crushers, e.g., jaw crusher, hammer crusher, roll crusher, etc., secondary crushers, e.g., cone crusher, double-roll crusher, edge runner, rotary crusher, autogenous tumbling mill, etc., and fine pulverizers, e.g., screen mill, centrifugal classifying mill, jet pulverizer, colloid mill, tower mill, roller mill, vibration ball mill, etc. The pulverization is effected by dry or wet process. The mica thus pulverized is dry or wet treated once or more by a cyclone, multilone, microseparator, microprex, cyclone air separator, ultra separator, hydrocyclone, hydraulic power classifier, centrifugal classifier, or the like so that it is adjusted to a range specified in the invention in particle size distribution. Ultrafine particles produced during classification process may be collected by a bag filter and then added to the above classified material to adjust the particle size distribution thereof. Alternately, natural mica may be purified and classified left unground or after ground by elutriation and then further precisely classified. The mica of the invention may be used untreated but may be preferably used after being treated at the surface thereof by common various silane coupling agents, titanium coupling agents, higher fatty acids, higher fatty acid esters, higher fatty acid amides, higher fatty acid salts or other surface active agents. The object of this treatment is to improve the adhesion to the surface of the crystalline propylene-ethylene copolymer resin or the dispersibility. These treating agents may be used before the mica is added to the resin so that the mica alone is treated or may be directly added to the composition.

The mixing proportions of (1) the crystalline propylene-ethylene copolymer resin, (2) rubber-like material and (3) mica having a specified average particle diameter and particle size distribution are 50 to 97% by weight, preferably 60 to 95% by weight for the component (1), 0 to 20% by weight, preferably 1 to 15% by weight for the component (2), and 3 to 50% by weight, preferably 5 to 40% by weight for the component (3), respectively. If the mixing proportion of the crystalline propylene-ethylene copolymer resin (1) is less than 50% by weight, the resulting resin composition shows poor rigidity and thermal resistance. Similarly, if the mixing proportion of the crystalline propylene-ethylene copolymer resin (1) is more than 97% by weight, the resulting resin composition shows poor rigidity. If the mixing proportion of the rubber-like material (2) is more than 20% by weight, the resulting resin composition shows poor rigidity, thermal resistance and scratch resistance. Further, if the mixing proportion of the mica (3) is less than 3% by weight, the resulting resin composition shows poor rigidity and thermal resistance, and if it is more than 50% by weight, the resulting resin composition shows poor impact strength, scratch resistance and appearance.

The resin composition of the invention may be mixed with a polyethylene resin besides the above ingredients. As the polyethylene resin there may be employed low density polyethylene, middle density polyethylene, high density polyethylene, and copolymer resin of ethylene and other-olefin (e.g., butene, pentene, or hexene), or unsaturated organic acid ester (e.g., vinyl acetate, methyl acrylate, methyl methacrylate, or glycidyl methacrylate). Preferable among these is a polyethylene having a melt index of 0.05 to 100 g/10 min. and a density of 0.93 g/cm$^3$ or more. The mixing proportion of the polyethylene resin is 20% or less by weight based on the weight of the copolymer resin composition of the invention excluding the mica. The mixing of the polyethylene resin into the copolymer resin composition helps to improve scratch resistance and impact strength. However, unless the mixing proportion of the polyethylene resin does not exceed 20% by weight, the resulting copolymer resin composition shows low rigidity.

Furthermore, other additives may be mixed into the copolymer resin composition. As the additives there may be employed inorganic filler other than mica, such as calcium carbonate, talc, clay, silica, magnesium carbonate, barium sulfate, titanium oxide, alumina, gypsum, glass fiber, calcium silicate, glass beads, carbon black, aluminum hydroxide, magnesium hydroxide, zeolite, diatomaceous earth, carbon fiber, and synthetic silicate fiber; anti-oxidants such as phenol compound, sulfur compound and phosphorus compound; ultraviolet light absorbents; lubricants; antistatic agents; copper inhibitors; flame retardants; nucleating agents; plasticizers; cross-linking agents; and pigments. The mixing proportion of these additives should be within a range in which the effects of the invention are not remarkably impaired. These additives may be mixed either singly or in combination with each other.

The composition of the invention may be produced by means of a kneader such as uniaxial extruder, biaxial extruder, Bumbury mixer, and heat roll. The respective components may be mixed with each other either simultaneously or separately. If the mixing is conducted separately, a number of steps may be used. For example, the polypropylene resin and the mica may be mixed with each other and then with the other components. The polypropylene resin and the rubber-like material may be mixed with each other and then with the other components. The polypropylene resin and high-concentration mica may be mixed with each other to provide a master batch which is then mixed with the other components.

Alternately, all the components may be directly supplied into various molding machines so that the kneading and molding can be effected at the same time. The temperature necessary for the kneading is within the range of 160° to 280° C. The kneading time is determined by the performance of the kneader used.

The composition obtained in accordance with the present invention can be formed by injection molding, extrusion molding, blow molding, sheet forming, rotary molding, laminate molding, thermoforming or the like and thus can be applied for various automobile parts materials such as instrument panel material, air cleaner case material, fan shroud material, car heater case material, trim material and bumper material; electrical appliance parts materials such as washing tank material, television panel material, iron grip material, fan material, video tape cassette material and radio cassette housing material; and office machine parts materials such as copying machine housing material and computer housing material.

The invention will be further illustrated in the following non-limiting examples:

The measurement of the physical properties were conducted as follows:

Flexural modulus:
  The flexural modulus was measured at a temperature of 23° C. in accordance with JIS K7203. The test pieces for measurement were obtained by molding by means of a screw in-line type injection molding machine manufactured by Sumitomo Shipbuilding & Machinery Co., Ltd.

Notched Izod impact strength:
  The notched Izod impact strength was measured at a temperature of 23° C. in accordance with JIS K7110. The test pieces for measurement were obtained by the same molding process as in the flexural modulus test.

Falling weight impact strength:
  The falling weight impact strength was measured at a temperature of 23° C. in accordance with JIS K7211. The test pieces for measurement were 90 mm×150 mm×3 mm sheets obtained by molding by means of the same molding machine as that used in the flexural modulus test.
  The falling weight was a 3 kg weight. The head of the dart had a radius with a diameter of ½ inch. The impact strength was determined by the falling energy (kg.cm) measured when the test piece was 50% destroyed.

Thermal distortion temperature:
  The thermal distortion temperature was measured in accordance with JIS K7207 with a fiber stress of 18.6 kg/cm$^2$.

Scratch resistance:
  The test pieces were leather-like embossed sheets having the same size as that used in the falling weight impact test. As the test apparatus a pencil scratch test machine (JIS K5401) was used. However, the pencil mount of the test machine was remodelled so that the side of a 100-yen coin contacts the test sheet. To conduct the test, a 3 kg load was placed on the 100-yen coin. The 100-yen coin thus loaded was allowed to run along the surface of the test sheet at a constant speed. The degree of the scratch thus obtained was visually evaluated under the following criterion:

| Judgment | |
|---|---|
| A | Scarcely marked scratch |
| B | Somewhat marked scratch |
| C | Fairly marked scratch |
| D | Extremely marked scratch, fluff |

EXAMPLES 1 TO 13

Crystalline propylene-ethylene copolymers, rubber-like materials or polyethylene shown below and muscovite (chemical analysis value: 49.3 wt% $SiO_2$; 38.3 wt% $Al_2O_3$; 0.38 wt% $Fe_2O_3$; 6.65 wt% $K_2O$; 4.5 wt% ignition loss) having a specified average particle diameter and particle size distribution obtained in accordance with the process shown below were mixed with each other at predetermined mixing proportions shown in Table 1 together with 0.3 part by weight of an anti-oxidant, Irganox ®1010 (manufactured by Ciba-Geigy AG) and 1.0 part by weight of a pigment consisting of Cyanine Blue, titanium oxide and carbon black in the proportion of 70:20:10 for 3 minutes by means of a Super Mixer (manufactured by Kawata Seisakusho K.K.). The resulting admixtures were kneaded at a temperature of 230° C. by means of a biaxial kneader ZSK-30 (manufactured by Welner Corporation) so that they were granulated into pellets. These pellets were extruded through a screw in-line type injection molding machine to form test pieces for measurement of physical properties. The results of the measurements are shown in Table 1.

Polypropylene resin (1) PP- A : Propylene-ethylene block copolymer resin with melt index (MI) of 10 g/10 min. and ethylene content of 7 wt%.
(2) PP- B : Propylene-ethylene block copolymer resin with MI of 2 g/10 min. and ethylene content of 8 wt%.
(3) PP- C : Propylene-ethylene block copolymer resin with MI of 25 g/10 min. and ethylene content of 12 wt%.

Rubber-like material (1) EPR- A : Ethylene-propylene rubber with Mooney viscosity at 100° C. ($ML_{1+4}^{100°\ C.}$) of 30 and ethylene content of 75 wt%.
(2) EPR- B : Ethylene-propylene rubber with $ML_{1+4}^{100°\ C.}$ of 45 and ethylene content of 50 wt%.
(3) SBR: Rubber obtained by hydrogenation of styrene-butadiene-styrene block copolymer with styrene content of 30 wt% and molecular weight of 50,000.

Polyethylene (1) PE: High density polyethylene with MI of 5.8 g/10 min. and density of 0.950.

Muscovite

Muscovite having the above chemical analysis value was crushed, elutriation-purified, classified, and then pulverized by means of a jet mill. The muscovite thus pulverized was subjected to precise classification in dry process by means of a centrifugal classifier to prepare mica having particle diameter and particle size distribution shown below.

The average particle diameter of the mica thus obtained was measured by means of a photo extinction and sedimentation method type measuring instrument SKC-2000 (manufactured by Seishin Kigyo Co., Ltd.).

(1) Mica- A : Muscovite with average particle diameter ($\overline{D}_{50}$) of 2.7μ, aspect ratio of 14, and particle size distribution of 98 wt% for 10μ or less, 80 wt% for 5μ or less and 30 wt% for 1μ or less.

(2) Mica- B : Muscovite with average particle diameter ($\overline{D}_{50}$) of 4.0μ, aspect ratio of 15, and particle size distribution of 97 wt% for 10μ or less, 75 wt% for 5μ or less and 15 wt% for 1μ or less.

(3) Mica- C : Muscovite with average particle diameter ($\overline{D}_{50}$) of 1.2μ, aspect ratio of 10, and particle size distribution of 99 wt% for 10μ or less, 92 wt% for 5μ or less, and 47 wt% for 1μ or less.

As can be seen in Table 1, all the examples showed excellent physical properties. Furthermore, all the compositions were easily formed into 90 mm×150 mm×3 mm sheets which had an excellent appearance without silver streak, warp and sink.

Muscovite (1) Mica- D : Muscovite with average particle diameter ($\overline{D}_{50}$) of 7μ, aspect ratio of 15, and particle size distribution of 55 wt% for 10μ or less, 40 wt% for 5μ or less, and 10 wt% for 1μ or less.

(2) Mica- E : Muscovite with average particle diameter ($\overline{D}_{50}$) of 10μ, aspect ratio of 20, and particle size distribution of 50 wt% for 10μ or less, 31 wt% for 5μ or less and 5 wt% for 1μ or less.

(3) Mica- F : Muscovite with average particle diameter ($\overline{D}_{50}$) of 4.3μ, aspect ratio of 12, and particle size distribution of 75 wt% for 10μ or less, 55 wt% for 5μ or less, and 18 wt% for 1μ or less.

(4) Mica- G : Muscovite with average particle diameter ($\overline{D}_{50}$) of 0.3μ, aspect ratio of 5, and particle size distribution of 100 wt% for 10μ or less, 97 wt% for 5μ or less, and 90 wt% for 1μ or less.

Table 2 shows that the resin compositions using micas

TABLE 1

| Example No. | Composition Component/wt % mixing proportion | | | | Property evaluation | | | | |
|---|---|---|---|---|---|---|---|---|---|
| | Polypropylene resin | Rubber-like material | Mica | Others | Flexural modulus (kg/cm²) | Notched Izod impact strength (kg · cm/cm) | Falling weight impact strength (kg · cm) | Thermal distortion temperature (°C.) | Scratch resistance |
| 1 | PP- A /75 | — | Mica- A /25 | — | 33,300 | 6.6 | 125 | 95 | A |
| 2 | PP- A /70 | EPR- A /5 | " | — | 30,900 | 8.3 | 150 | 93 | A |
| 3 | PP- A /65 | EPR- A /10 | " | — | 25,600 | 17.0 | 160 | 81 | B |
| 4 | PP- A /60 | EPR- A /15 | " | — | 21,000 | 28.0 | 190 | 75 | B |
| 5 | PP- A /70 | EPR- A /5 | Mica- B /25 | — | 30,200 | 7.8 | 140 | 93 | A |
| 6 | " | " | Mica- C /25 | — | 31,000 | 9.0 | 160 | 94 | A |
| 7 | " | EPR- B /5 | Mica- A /25 | — | 30,200 | 9.0 | 160 | 91 | A |
| 8 | " | SBR/5 | " | — | 31,500 | 8.5 | 150 | 93 | A |
| 9 | PP- A /65 | EPR- A /3 | " | PE/7 | 28,500 | 12.0 | 140 | 85 | A |
| 10 | PP- B /70 | EPR- A /5 | " | — | 30,500 | 9.6 | 165 | 93 | A |
| 11 | PP- C /70 | " | " | — | 28,600 | 10.3 | 145 | 85 | A |
| 12 | PP- A /85 | " | Mica- A /10 | — | 19,500 | 12.5 | 160 | 75 | A |
| 13 | PP- A /55 | " | Mica- A /40 | — | 41,700 | 7.8 | 130 | 102 | B |

COMPARATIVE EXAMPLES 1 TO 5

As the crystalline propylene-ethylene copolymer resin and rubber-like material there were employed PP- A and EPR- A , respectively. As the muscovites there were employed mica- D , mica- E , mica- F and mica- G . Mica- D , mica- E and mica- F were obtained by modifying the jet mill crushing conditions, omitting or modifying the classification process in the preparation of muscovite used in Examples 1 to 13. Mica- G was obtained by wet-pulverizing a material elutriation-classified in Example 1 by a colloid mill and then subjecting the pulverized material to precise classification in wet process. The components were mixed with each other by the same process as that used in Examples 1 to 13. The admixtures were then kneaded so that they were granulated to form pellets. The results of the measurements of the physical properties of these samples are shown in Table 2.

whose average particle diameter and/or particle size distribution are out of the specified range of the invention cannot achieve the objects of the invention. In particular, highly balanced properties cannot be obtained. Furthermore, a 90 mm×150 mm×3 mm sheet formed of the composition obtained in Comparative Example 5 showed some silver streaks near the gate thereof.

COMPARATIVE EXAMPLE 6

This comparative example was conducted under the same conditions as that used in Example 2 except that the components shown in Table 2 were used.

The results of the various tests are shown in Table 2. It is apparent from Table 2 that even mica showing an average particle diameter and particle size distribution within the specified range of the invention reduces the impact strength if added in excess amount.

TABLE 2

| Comparative Example No. | Composition Component/wt % mixing proportion | | | Property evaluation | | | | |
|---|---|---|---|---|---|---|---|---|
| | Polypropylene resin | Rubber-like material | Mica | Flexural modulus (kg/cm²) | Notched Izod impact strength (kg · cm/cm) | Falling weight impact strength (kg · cm) | Thermal distortion temperature (°C.) | Scratch resistance |
| 1 | PP- A /75 | — | Mica- D /25 | 29,500 | 4.8 | 40 | 86 | B |
| 2 | PP- A /70 | EPR- A /5 | " | 27,100 | 6.2 | 55 | 83 | C |
| 3 | " | " | Mica- E /25 | 26,300 | 4.6 | 40 | 85 | D |
| 4 | " | " | Mica- F /25 | 28,500 | 7.3 | 75 | 88 | B |
| 5 | " | " | Mica- G /25 | 26,500 | 9.0 | 160 | 85 | A |
| 6 | PP- A /35 | " | Mica- A /60 | 65,000 | 3.0 | 20 | 107 | D |

While the invention has been described in detail and with reference to specific embodiments thereof, it will be apparent to one skilled in the art that various changes and modifications can be made therein without departing from the spirit and scope thereof.

What is claimed is:

1. A polypropylene resin composition comprising 50 to 97% by weight of a crystalline propylene-ethylene copolymer resin having a melt index within the range of 0.1 to 100, 0 to 20% by weight of a rubber material, and 3 to 50% by weight of mica having an average particle diameter determined by photo extinction and sedimentation method of 0.5 to 4.5$\mu$ and a particle size distribution of 95% or more by weight for 10$\mu$ or less, 60% or more by weight for 5$\mu$ or less, and 10 to 80% by weight for 1$\mu$ or less.

2. A resin composition as claimed in claim 1, wherein said crystalline propylene-ethylene copolymer resin is a propylene-ethylene block copolymer resin.

3. A resin composition as claimed in claim 1, wherein said rubber-like material is one selected from the group consisting of ethylene-propylene rubber, ethylene-butene rubber and styrene-butadiene rubber.

4. A resin composition as claimed in claim 1, wherein said mica is one obtained by precise classification of pulverized natural muscovite.

* * * * *